United States Patent
Lottes et al.

(10) Patent No.: US 11,505,204 B2
(45) Date of Patent: Nov. 22, 2022

(54) INFORMATION PROCESSING SYSTEM AND METHOD FOR PROCESSING INFORMATION

(71) Applicant: AUDI AG, Ingolstadt (DE)

(72) Inventors: Daniel Lottes, Ihrlerstein (DE); Philipp Weiss, Düsseldorf (DE); Marcus Richter, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 24 days.

(21) Appl. No.: 17/335,711

(22) Filed: Jun. 1, 2021

(65) Prior Publication Data
US 2021/0370966 A1    Dec. 2, 2021

(30) Foreign Application Priority Data
Jun. 2, 2020 (DE) .................. 10 2020 114 656.6

(51) Int. Cl.
*G09G 5/00* (2006.01)
*B60W 50/14* (2020.01)
*G06V 20/56* (2022.01)

(52) U.S. Cl.
CPC ............. *B60W 50/14* (2013.01); *G06V 20/56* (2022.01); *B60W 2050/146* (2013.01)

(58) Field of Classification Search
CPC .............. G09G 5/003; G09G 2358/00; G06F 11/3485; G06F 9/542; G06F 3/04812; G06F 11/3051; G06F 11/3006; G06F 11/3055; G06F 11/328; G06F 11/3486
See application file for complete search history.

(56) References Cited

U.S. PATENT DOCUMENTS

| | | | |
|---|---|---|---|
| 10,621,947 B2* | 4/2020 | Ichihara | G06F 3/04812 |
| 2008/0159191 A1* | 7/2008 | Wang | H04W 8/005 |
| | | | 455/566 |
| 2018/0276934 A1* | 9/2018 | Mihara | G06T 1/0007 |
| 2018/0367740 A1* | 12/2018 | Ito | H04N 5/23293 |
| 2021/0342785 A1* | 11/2021 | Mann | G06F 16/116 |
| 2022/0019399 A1* | 1/2022 | Ohno | G06F 3/147 |

FOREIGN PATENT DOCUMENTS

| | | |
|---|---|---|
| DE | 10 2012 214 988 A1 | 4/2013 |
| DE | 10 2014 011 278 A1 | 1/2015 |
| DE | 10 2015 207 337 A1 | 10/2016 |

OTHER PUBLICATIONS

German Patent Application No. 10 2020 114 656.6, Jun. 2, 2020, Daniel Lottes, Audi AG.

* cited by examiner

*Primary Examiner* — John Kwon
(74) *Attorney, Agent, or Firm* — Staas & Halsey LLP

(57) ABSTRACT

A first information processing apparatus and a second information processing apparatus communicate with one another. The first information processing apparatus has a first communication device and the second information processing apparatus has a second communication device. The first information processing apparatus displays combined state information of the first and second information processing apparatuses on a first display device, such that the combined state information of the first and second information processing apparatuses is superimposed with surroundings information on the first display device. The second information processing apparatus displays the combined state information of the first and second information processing apparatuses on a second display device.

20 Claims, 1 Drawing Sheet

INFORMATION PROCESSING SYSTEM AND METHOD FOR PROCESSING INFORMATION

CROSS-REFERENCE TO RELATED APPLICATIONS

This application claims the benefit of priority under 35 U.S.C. § 119 to German Patent Application No. 10 2020 114 656.6 filed on Jun. 2, 2020, in the German Patent and Trademark Office. The disclosure of German Patent Application No. 10 2020 114 656.6 filed on Jun. 2, 2020, is hereby incorporated by reference in its entirety.

BACKGROUND

Described herein is an information processing system and a method for processing information.

Other methods pertaining to information processing are described by German Patent Application No. 10 2014 011 278 A1, German Patent Application No. 10 2015 207 337 A1, and German Patent Application No. 10 2012 2014 988 A1.

SUMMARY

One or more aspects of the disclosure are based on providing an improved information processing system and an improved method for processing information.

In accordance with various example embodiments described herein, an improved information processing system and an improved method for processing information may be provided. Advantageous further developments are also described herein.

According to an example, an information processing system includes a first information processing apparatus and a second information processing apparatus, which are suitable for communicating with one another. The first information processing apparatus has a first communication device. The first information processing apparatus is suitable for displaying combined state information of the first and second information processing apparatuses on a first display device, such that the combined state information of the first and second information processing apparatuses is superimposed with surroundings information on the first display device. The second information processing apparatus has a second communication device. The second information processing apparatus is suitable for displaying the combined state information of the first and second information processing apparatuses on a second display device.

By way of example, the second information processing apparatus can be operable after an operating process of the first information processing apparatus has ended. The first information processing apparatus can be operable after an operating process of the second information processing apparatus has ended.

In accordance with further embodiments, the first and second information processing apparatuses can be operable simultaneously.

Furthermore, the information processing system can be switchable between a first and a second state, wherein in the first state the second information processing apparatus is operable after an operating process of the first information processing apparatus has ended, and the first information processing apparatus is operable after an operating process of the second information processing apparatus has ended.

In the second state the first and second information processing apparatuses can be operable simultaneously.

In accordance with embodiments, the first information processing apparatus can be suitable for obtaining combined state information of the first and second information processing apparatuses by way of the first communication device. Furthermore, the second information processing apparatus can be suitable for obtaining the combined state information of the first and second information processing apparatuses by way of the second communication device.

In accordance with further embodiments, the first or second information processing apparatus can be suitable for determining changed combined state information of the first and second information processing apparatuses from an operating process of the first or second information processing apparatus and for communicating the changed combined state information to respectively the second or first information processing apparatus.

In accordance with embodiments, the first or second information processing apparatus can be suitable for determining change information from an operating process of the first or second information processing apparatus and for communicating the change information to respectively the second or first information processing apparatus.

In accordance with embodiments, the first display device can include a combination of a windshield of a vehicle and a head-up display. In this case, the first display device can be realized in a simple manner.

In accordance with further embodiments, the first communication device can additionally be suitable for obtaining surroundings information. By way of example, the first communication device can obtain the surroundings information from a sensor, for example a camera.

By way of example, the combined state information of the first and second information processing apparatuses can correspond to a game state of the first and second information processing apparatuses.

By way of example, the combined state information of the first and second information processing apparatuses that can be presented on the first and second display devices can be identical in each case.

In accordance with embodiments, the first information processing apparatus can be operable by use of a first operating element including a vehicle operating element or a control device of a vehicle. In this way, the first information processing apparatus can be operated without components additionally being required.

Further embodiments relate to a method for processing information using a first information processing apparatus and a second information processing apparatus, which are suitable for communicating with one another. In this case, the first information processing apparatus displays combined state information of the first and second information processing apparatuses on a first display device, such that the combined state information of the first and second information processing apparatuses is superimposed with surroundings information on the first display device. Furthermore, the second information processing apparatus displays combined state information of the first and second information processing apparatuses on a second display device.

By way of example, the second information processing apparatus can be operable after an operating process of the first information processing apparatus has ended. The first information processing apparatus can be operable after an operating process of the second information processing apparatus has ended.

In accordance with further embodiments, the first and second information processing apparatuses can be operable simultaneously.

BRIEF DESCRIPTION OF THE DRAWINGS

Further advantages and details will become apparent and more readily appreciated from the following description of example embodiments with reference to the accompanying drawings, in which.

DETAILED DESCRIPTION

Figure 1:
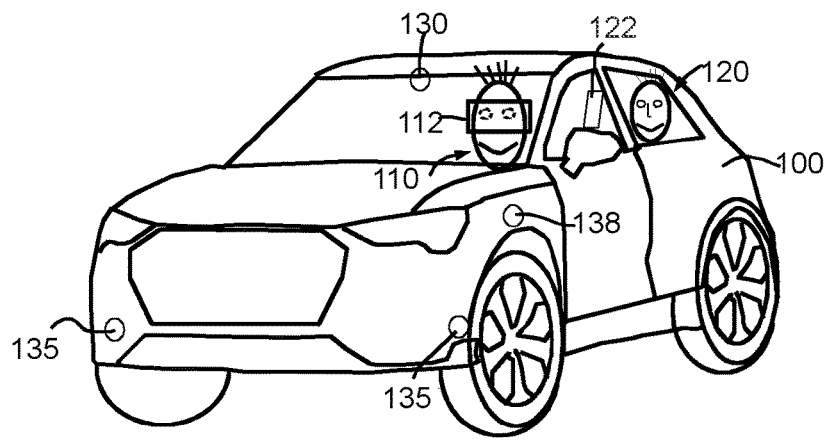
FIG. 1 is a perspective view of a vehicle with occupants in which a method for processing information is able to be carried out.

The accompanying drawings serve to afford an understanding of example embodiments described herein. The drawings illustrate example embodiments and deliver the description so as to elucidate the latter. Further example embodiments and numerous advantages from among those intended are evident directly from the detailed description. The elements and structures shown in the drawings are not necessarily illustrated in a manner true to scale with respect to one another. Identical reference signs refer to identical or mutually corresponding elements and structures.

The description of the example embodiments is not limiting since other example embodiments exist as well and structural or logical changes can be made, without in so doing departing from the scope defined by the patent claims. For example, elements of example embodiments described below can be combined with elements of other example embodiments from among those described, provided that nothing to the contrary is evident from the context.

FIG. 1 shows a vehicle 100 with two occupants, for example a driver 110 and a passenger 120. The vehicle 100 can have a camera 130, for example, which is suitable for capturing images or video sequences of the surroundings. Further sensors 135, 138 can capture further information about the state of the vehicle 100. By way of example, the sensors can include first sensors 135, which can determine for example the position or a state of the vehicle 100, for example an inclination, a longitudinal acceleration or a transverse acceleration. Second sensors 138 can be control sensors, for example, which determine control signals supplied by operating elements of the vehicle, for example the steering, the brake, the accelerator pedal, or by other control components, whereby the driving behavior is able to be determined. By way of example, the second sensors 138 can detect actions of a driver that directly influence the driving process.

A first display device 112 can be assigned to the first occupant or driver 110. By way of example, the first display device 112 can be special glasses or can include a head-up display. By way of example, the head-up display can be suitable for superimposing information on the windshield. By way of example, if a head-up display is used, the first display device can correspond to a combination of windshield and head-up display. In accordance with further embodiments, the first display device can also be a screen.

A second display device 122 can be assigned to the second occupant 120. By way of example, the second display device can be an arbitrary screen, for example of a mobile terminal, or a display device attached to the rear of the front seat, or special glasses. The vehicle 100 can be an arbitrary vehicle, for example a driver-controlled automobile or else an autonomously driving vehicle.

Figure 2:
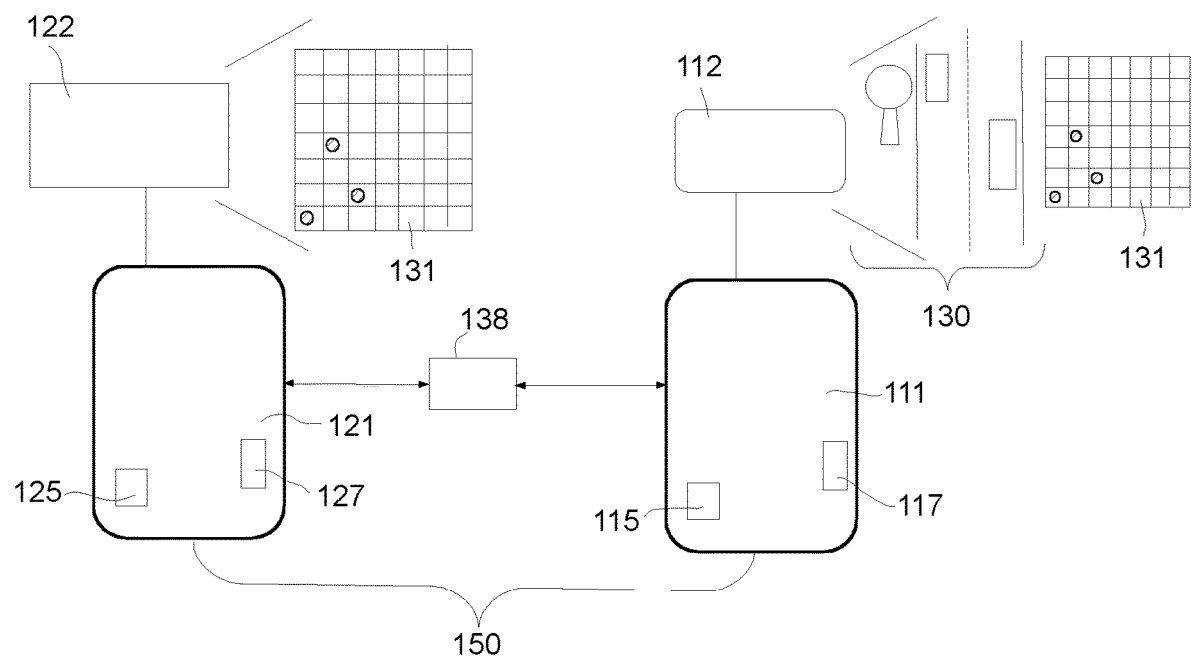
FIG. 2 is a schematic view of details of an information processing system in accordance with example embodiments described herein.

FIG. 2 illustrates components of an information processing system 150 in accordance with embodiments. The information processing system 150 includes a first information processing apparatus 111 and a second information processing apparatus 121. The first information processing apparatus 111 has a first communication device 115. The first information processing apparatus 111 is furthermore suitable for displaying combined state information of the first and second information processing apparatuses on a first display device 112, such that the combined state information of the first and second information processing apparatuses is superimposed with surroundings information on the first display device 112. The first information processing apparatus 111 is operable by use of a first operating element 117, for example.

The second information processing apparatus 112 has a second communication device 125. The second information processing apparatus 121 is furthermore suitable for displaying the combined state information of the first and second information processing apparatuses on a second display device 122. The second information processing apparatus 121 is operable by use of a second operating element 127, for example.

The first communication device and the second communication device can each be suitable for communicating with one another. By way of example, the first and second communication devices can be suitable for communicating with one another wirelessly, for example via Bluetooth or W-LAN. In accordance with further embodiments, the first and second communication devices can include an interface for wired communication. In the context of the disclosure, the term "communicate with one another" also encompasses indirect communication. By way of example, the first communication device and the second communication device can communicate with one another via one or more further apparatuses, for example an on-board computer.

By way of example, the information processed by the information processing system can be game information. The first information processing apparatus can be operable by use of a first operating element 117. The second information processing apparatus can be operable by use of a second operating element 127. By way of the first or second operating element, the first or second vehicle occupant can in each case control the game and input plans for carrying out the game. Actuation of the operating element brings about in each case a change in the game state. The change in the game state can correspond for example to a game move or an action of respectively the first or second occupant. The combined state information of the first and second information processing apparatuses can correspond in each case to the game state. The latter can arise from a game state before an operating process is carried out and the change taking account of the operating process performed.

The first operating element 117 can for example be an operating element of the vehicle or of the controller or include any other customary input device, for example also a voice assistant or a gesture-based controller. By way of example, it can be a lever on the steering wheel. The second operating element 127 can include for example an operating element on the second information processing apparatus 121, an operating element on the second display device or a separate operating element, for example a joystick or some other customary input device.

The synchronization and the communication of the combined state information can be effected in different ways. Methods suitable for the synchronization of information processing devices are usable, in principle.

In accordance with embodiments, the synchronization can be effected by way of a further apparatus 138, for example an on-board computer or a server arranged outside the vehicle. By way of example, the first information processing apparatus 111 can be suitable for obtaining, via the first communication device 115, combined state information of the first and second information processing apparatuses, for example from the further apparatus 138. Furthermore, the second information processing apparatus can be suitable for obtaining, via the second communication device, the combined state information of the first and second information processing apparatuses, for example from the further apparatus 138. By way of example, in this case the first information processing apparatus 111 can additionally be suitable for feeding change information arising from an operating process to the further apparatus 138 via the first communication device 115. Furthermore, the second information processing apparatus 121 can additionally be suitable for feeding change information arising from an operating process of the second information processing apparatus 121 to the further apparatus 138 via the second communication device 125. The further apparatus then determines the new current combined state information on the basis of the change information obtained and the combined state information before the operating process is carried out.

In accordance with further embodiments, it is also possible for one of the two apparatuses to act as a master and to implement the function of the further apparatus 138. By way of example, the first information processing apparatus 111 can obtain change information of the first or second information processing apparatus or from both and can determine the changed combined state information therefrom. The changed combined state information can be displayed on the first display device 112 and additionally be communicated to the second information processing apparatus 121. Alternatively, the second information processing apparatus 121 can perform these functions.

In accordance with further embodiments, the first information processing apparatus can be suitable for determining change information from an operating process of the first information processing apparatus and for communicating the change information to the second information processing apparatus. Furthermore, the second information processing apparatus can be suitable for determining change information from an operating process of the second information processing apparatus and for communicating the change information to the first information processing apparatus. By way of example, the first and second information processing apparatuses can be suitable for determining combined state information of the first and second information processing apparatuses taking account of the change information and for displaying the combined state information.

The combined state information of the first and second information processing apparatuses can thus be determined for example by the first information processing apparatus, the second information processing apparatus or by both apparatuses.

As is shown in the box next to the first display device 112, both the surroundings information, that is to say for example the road on which the vehicle is currently situated, (designated by 130) and combined state information (designated by 131) are presented on the first display device 112. The first and second occupants 110, 120 can play a game, for example chess. After the second occupant 120 has made a move, for example the changed status of the game, i.e. the chess board with the then changed pieces, can be communicated to the first information processing apparatus and can be presented on the first display device as a representation or an image or an image sequence 131. In accordance with further embodiments, it is also possible for only the change, that is to say information about the chess move, to be communicated to the first information processing apparatus 111. The first information processing apparatus 111 determines the current status of the game from the status of the game before the chess move and the chess move performed and presents the current status of the game on the first display device as a representation or an image or an image sequence 131.

In accordance with embodiments, the first vehicle occupant 110 sees both an image 130 of the surroundings and an image or an image sequence 131 of the current status of the game being played on the first display device 112. An AR ("augmented reality") image including both the surroundings information and the game information is thus presented on the first display device 112. This can be done for example by virtue of the first display device 112 corresponding to a combination of windshield and head-up display. Through the windshield the surroundings information is detected or represented and superimposed with the combined state information displayed by the head-up display. In accordance with further embodiments, the first communication device 115 can also obtain the surroundings information from a sensor, for example a camera. By way of example, the camera can record a real-time video sequence. The latter can then be superimposed with the combined state information on the first display device 112.

In this way, the first vehicle occupant 110 can join in playing the game, but on the other hand also sees what is happening in his/her surroundings, for example the fact that the traffic light changes to green again. In this case, the vehicle occupant must temporarily interrupt the game until the next game move can take place at the next traffic light. The term "surroundings information" can encompass for example information about the surroundings of the vehicle, for example the road in the direction of travel. By way of example, the term "surroundings information" can additionally encompass information about vehicles in the vicinity, for example approaching vehicles, and traffic signs and traffic lights.

By contrast, rather than surroundings information only the image or the image sequence 131 corresponding to the combined state information of the first and second information processing apparatuses 111, 121 is displayed on the second display device of the second information processing apparatus. This corresponds to a VR ("virtual reality") image that includes just the game information.

In accordance with embodiments, the second information processing apparatus can be operable after an operating process of the first information processing apparatus has ended. The first information processing apparatus can be operable after an operating process of the second information processing apparatus has ended. In this way, for example, a turn-based or asynchronous game can be carried out. This mode of operation can be chosen for example if the player only ever participates actively in the game in pause situations, for example when a traffic light is red. By way of example, in this case, a virtual chess board is shown on the first display device 112. The player can make moves on this chess board by use of an input apparatus. After each move made by the second vehicle occupant, it is the turn of the driver or the first vehicle occupant. Since the game is turn-based and thus independent of time, the driver's move can be made at a red traffic light, for example.

In accordance with further embodiments, the first and second information processing apparatuses can be operable simultaneously. By way of example, in a parked position or during autonomous driving, both players can play together simultaneously. By way of example, the first information processing apparatus 111 can be operated in the AR mode, while the second information processing apparatus 121 is operated in the VR mode. By way of example, in this case, the first information processing apparatus 111 has a restricted field of view. That is to say that the first and second information processing apparatuses can each have mutually different restrictions. By way of example, the combined state arising from an action of the second information processing apparatus 121 can be displayed on the display device 112 of the first information processing apparatus 111. The first vehicle occupant can thereupon manipulate further the action begun by the second vehicle occupant, using the first operating element 117. By way of example, the second vehicle occupant, having the full field of view (for example 360°), can present a journey in arbitrary directions. By way of example, a virtual chase can be presented on the second display device 122. By contrast, the first occupant, having a restricted field of view, by actuating the first operating element 117 in the game can operate an on-board gun and shoot down virtual enemy spaceships.

In accordance with further embodiments, the information processing system can be switchable between the first and second states, depending on the current driving situation and the requirements of the vehicle occupants.

In accordance with further embodiments, signals of the further sensors 135, 138 can additionally be used for generating the image or the image sequence 131 of the current status of the game. By way of example, information about the inclination of the vehicle, accelerations that occur or control signals can be used to adapt the image or the image sequence 131 of the current status of the game to the perceived driving process. The user experience can be enhanced in this way.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004). As an example, the scope of the expression "at least one of A, B, and C" is intended to include: (1) at least one of A, (2) at least one of B, (3) at least one of C, (4) at least one of A and at least one of B, (5), at least one of A and at least one of C, (6) at least one of B and at least one of C, and (7) at least one of A, at least one of B, and at least one of C.

The invention claimed is:

1. An information processing system, comprising:
a first information processing apparatus having a first communication device; and
a second information processing apparatus, having a second communication device,
wherein
the first information processing apparatus and the second information processing apparatus are configured to communicate with one another,
the first information processing apparatus is configured to display combined state information of the first and second information processing apparatuses on a first display device, such that the combined state information of the first and second information processing apparatuses is superimposed with surroundings information on the first display device, and
the second information processing apparatus is configured to display the combined state information of the first and second information processing apparatuses on a second display device.

2. The information processing system according to claim 1, wherein
the second information processing apparatus is operable after an operating process of the first information processing apparatus has ended, and
the first information processing apparatus is operable after an operating process of the second information processing apparatus has ended.

3. The information processing system according to claim 1, wherein the first and second information processing apparatuses are operable simultaneously.

4. The information processing system according to claim 1, wherein
the information processing system is switchable between a first state and a second state,
in the first state the second information processing apparatus is operable after an operating process of the first information processing apparatus has ended, and the first information processing apparatus is operable after an operating process of the second information processing apparatus has ended, and
in the second state the first and second information processing apparatuses are operable simultaneously.

5. The information processing system according to claim 1, wherein
the first information processing apparatus is configured to obtain combined state information of the first and second information processing apparatuses via the first communication device, and
the second information processing apparatus is configured to obtain the combined state information of the first and second information processing apparatuses via the second communication device.

6. The information processing system according to claim 1, wherein
the first information processing apparatus is configured to determine changed combined state information of the first and second information processing apparatuses from an operating process of the first or second information processing apparatus and is configured to communicate the changed combined state information to the second information processing apparatus, or
the second information processing apparatus is configured to determine changed combined state information of the first and second information processing apparatuses from an operating process of the first or second information processing apparatus and is configured to communicate the changed combined state information to the first information processing apparatus.

7. The information processing system according to claim 1, wherein
the first information processing apparatus is configured to determine change information from an operating process of the first or second information processing apparatus and to communicate the change information to the second information processing apparatus, or
the second information processing apparatus is configured to determine change information from an operating process of the first or second information processing apparatus and to communicate the change information to the first information processing apparatus.

8. The information processing system according to claim 1, wherein the first display device includes a combination of a windshield of a vehicle and a head-up display.

9. The information processing system according to claim 1, wherein the first communication device is configured to obtain surroundings information.

10. The information processing system according to claim 1, wherein the combined state information of the first and second information processing apparatuses corresponds to a game state of the first and second information processing apparatuses.

11. The information processing system according to claim 1, wherein the combined state information presented on the first display device of the first information processing apparatus is identical to the combined state information presented on the second display device of the second information processing apparatus.

12. The information processing system according to claim 1, wherein the first information processing apparatus is operable by use of a first operating element including a vehicle operating element or a control device of a vehicle.

13. A method for processing information using a first information processing apparatus and a second information processing apparatus, which are configured to communicate with one another, the method comprising:
  displaying, by the first information processing apparatus, combined state information of the first and second information processing apparatuses on a first display device, such that the combined state information of the first and second information processing apparatuses is superimposed with surroundings information on the first display device; and
  displaying, by the second information processing apparatus, combined state information of the first and second information processing apparatuses on a second display device.

14. The method according to claim 13, further comprising:
  in response to an operating process of the first information processing apparatus ending, permitting the second information processing apparatus to be operable; and
  in response to an operating process of the second information processing apparatus ending, permitting the first information processing apparatus to be operable.

15. The method according to claim 13, wherein the first and second information processing apparatuses are operable simultaneously.

16. The method according to claim 13, further comprising:
  in a first state of the second information processing apparatus, permitting the second information processing apparatus to be operable only after an operating process of the first information processing apparatus has ended; and
  in a second state, permitting the second information processing apparatus and the first information processing apparatus to be operable simultaneously.

17. The method according to claim 13, further comprising:
  obtaining, by the first information processing apparatus, combined state information of the first and second information processing apparatuses via a first communication device of the first information processing apparatus;
  obtaining, by the second information processing apparatus, the combined state information of the first and second information processing apparatuses via a second communication device of the second information processing apparatus; and
  displaying, on the first and second display devices, the combined state information of the first and second information processing apparatuses, the combined state information of the first and second information processing apparatuses displayed by the first display device being identical to the combined state information of the first and second information processing apparatuses displayed by the second display device.

18. The method according to claim 13, further comprising:
  determining, by the first information processing apparatus, changed combined state information of the first and second information processing apparatuses based on an input to one of the first and second information processing apparatuses; and
  communicating only the changed combined state information to the second information processing apparatus.

19. The method according to claim 13, further comprising:
  obtaining, by a first communication device of the first information processing apparatus, the surroundings information from a vehicle; and
  adapting a presentation of the combined state information displayed on the first display device according to information about a state of the vehicle received from the vehicle.

20. The method according to claim 13, wherein the first display device includes a head-up display of a vehicle, and the method further comprises:
  operating the first information processing apparatus in a first state when the vehicle is non-autonomously driven, such that the first information processing apparatus is operable only after an operating process of the second information processing apparatus has ended; and
  operating the first information processing apparatus in a second state when the vehicle is autonomously driven or in a parked state, such that the first information processing apparatus and the second information processing apparatus are simultaneously operable.

* * * * *